Oct. 30, 1923.
H. D. FLEMING ET AL
1,472,643
COMBINED FILLER PLUG AND VALVE
Filed March 13, 1922
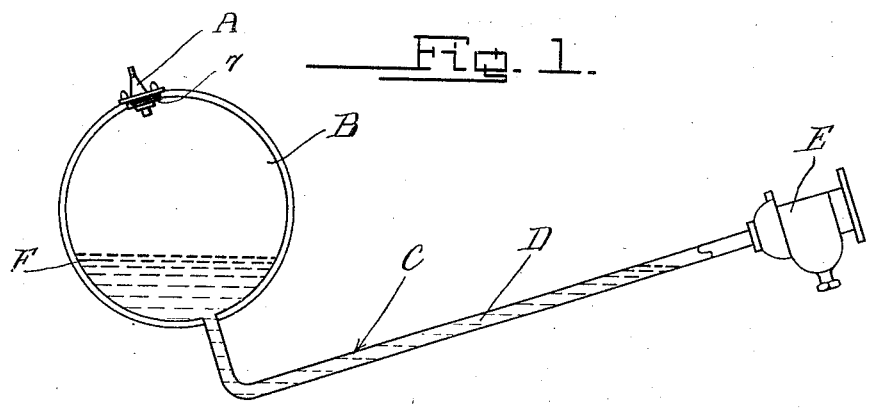
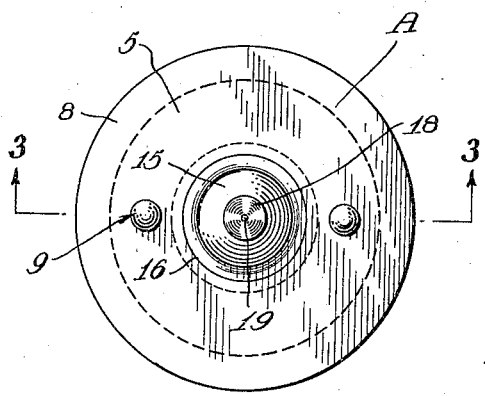
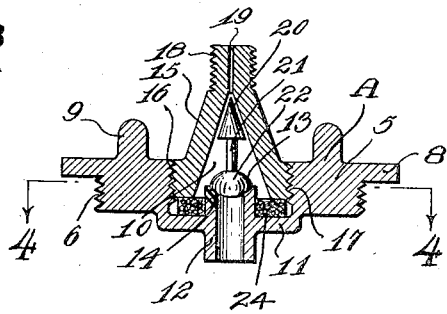
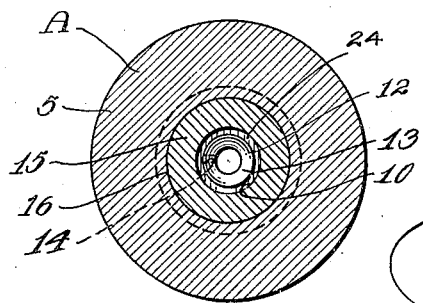
Herbert D. Fleming
Leo F. Matthews
Edgar C. Fleming
*Inventors*
By *Lancaster and Allwine*
*Attorneys*

Patented Oct. 30, 1923.

1,472,643

UNITED STATES PATENT OFFICE.

HERBERT D. FLEMING AND LEO F. MATTHEWS, OF NEW KENSINGTON, AND EDGAR C. FLEMING, OF RENFREW, PENNSYLVANIA.

COMBINED FILLER PLUG AND VALVE.

Application filed March 13, 1922. Serial No. 543,500.

*To all whom it may concern:*

Be it known that we, HERBERT D. FLEMING, LEO F. MATTHEWS, and EDGAR C. FLEMING, citizens of the United States, residing at New Kensington, Westmoreland Co., Pa., New Kensington, Westmoreland Co., Pa., and Renfrew, Butler Co., Pa., have invented certain new and useful Improvements in Combined Filler Plugs and Valves, of which the following is a specification.

This invention relates to fuel systems, and the primary object of the invention is the provision of a combined valve and filler cap for the tanks of gravity fed fuel systems of automotive vehicles, so that pressure may be introduced into the tank for forcing the fuel to the carburetor, when the fuel in the tank becomes relatively low and will not flow by gravity to the carburetor, such as when a vehicle is climbing up an incline.

A further object of the invention is the provision of a novel means for disposing the valve in the filler plug so that under normal running conditions free access of air into and out of the tank will be allowed, so that uninterrupted flow of the fuel from the tank will be permitted.

A further object of the invention is the provision of novel means for incorporating the pressure valve in the plug, so that the said valve can be readily and easily removed or replaced when necessary or desirable.

A still further object of the invention is to provide a combined filler plug and pressure valve for fuel tanks of gravity fed fuel systems of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a section through the fuel tank and its delivery tube showing the combined valve and filler plug attached thereto.

Figure 2 is a top plan view of the improved combined valve and filler plug.

Figure 3 is a diametric section through the same taken on the line 3—3 of Figure 2.

Figure 4 is a horizontal section through the improved combined valve and plug, taken on the plane indicated by the line 4—4 of Figure 3.

Referring more particularly to the drawings, wherein similar reference characters designate corresponding parts throughout the several views, the letter A generally indicates the improved combined valve and filler plug for the tank B of a gravity feed fuel system C.

The fuel system C is, of course, of the usual construction, and the tank B has communicating with its lower end the supply tube D, which leads to a carburetor E.

In use, when the fuel as indicated at F in Figure 1 of the drawings becomes relatively low in the tank B and the vehicle is ascending an incline, the tilting of the body of the vehicle will tilt the tank and feed tube D so as to materially interfere with the proper feed of the gasoline or fuel to the carburetor, thereby resulting in the stopping of the engine with which the carburetor E is associated and at such times it is desirable to subject the fuel in the tank D to pressure for forcing the same to the carburetor and to facilitate this application of pressure to the fuel within the tank B, the improved filler plug and valve A has been designed.

The improved combined filler plug valve A comprises the usual plug portion 5, the outer surface of which is provided with external threads 6 for engaging the companion threads formed in the filler opening 7 in the tank B. The upper edge of the plug body 5 at the periphery thereof can be provided with an annular outstanding flange 8, for overlying the outer surface of the tank. The plug 5 can be provided with any suitable means for facilitating the grasping thereof so that the same can be readily turned into or out of the filler opening 7, and by way of example in the drawings, the plug is provided with diametrically opposed upstanding lugs 9. The plug 5 at its axis is provided with an enlarged bore or chamber 10, the lower wall of which is depressed as shown at 11. The axial center of the depressed wall 11 is provided with an axially disposed sleeve or tube 12, which extends into the chamber 10 and below the wall 11 as clearly shown in Figure 3 of the drawings. The upper end of this sleeve is shaped to provide a valve seat or rest 13. If so desired, the sleeve or tube 12 adjacent its upper edge can be provided with a by pass 14, so as to permit the free flow of air into the tank when the fuel is flowing from the tank under normal conditions and when pressure has not been introduced into the tank.

The conical shaped valve housing 15 at its lower end is circular shaped and provided with external threads 16 for engagement with internal threads 17 formed on the side wall of the chamber 10. The extreme upper end of the valve housing 15 is provided with a screw threaded nipple 18 so that the tube of a pressure supplying device, such as a pump, can readily be attached thereto. The nipple has a bore 19 extending axially therethrough. A conical shaped valve 20 is adapted to normally seat on the inner surface of the conical shaped housing 15 and to close the bore 19 when pressure has been introduced into the tank B. This conical valve 20 is provided with a depending stem 21, which can be provided with a head 22 for fitting upon the seat or rest 13. It is obvious that when the head 22 fits upon the seat 13 that the valve 20 is in such a position as to allow free flow of air through the bore 19 and the head 22 forms means for preventing displacement of the valve. Further, the head 22 forms a weight so that when the pressure in the tank decreases below a predetermined volume, the valve will be moved downwardly to permit the escape of pressure from the tank.

If desirable, a suitable gasket 24 formed of felt, leather or the like, may be placed around the upper end of the nipple or sleeve 12 in engagement with the upper face of the depressed wall 11, and this gasket or washer forms a seat for the lower end of the housing 15 and prevents escape of air under pressure in the tank past the threaded engagement of the housing 15 and plug 5.

In operation, when fuel is low in the tank B and will not flow by gravity into the carburetor E, it is merely necessary to couple the feed tube of a pressure generating device, such as a pump, to the nipple 18 and the air flowing into the chamber 10 through the bore 19 will flow through the by-pass 14 into the tank. When the pressure in the tank B reaches a predetermined degree, which will adequately force the fuel F from the tank, the feed tube of the pressure device is uncoupled from the nipple 18 and the valve 20 will be automatically forced on the seat by the pressure acting against the head 22 and the valve 20. This nipple, if desired, may be closed by any suitable form of cap (not shown). If it is desired to release pressure from the tank for any purpose, it is merely necessary to insert a fine instrument, such as a needle through the bore 19 so as to hold the valve 20 off of its seat, which will permit the free flow of air from the tank or if such instrument is not available, the housing 15 may be turned out of engagement with the gasket 24 and the air permitted to seep out past the cooperating threaded portions of the housing 15 and plug 5. It is also obvious that when the system is operating under usual conditions, that air will be permitted to circulate into the tank through the by-pass 14 and the bore 19.

When the valve 20 becomes worn or broken through any cause, it is merely necessary to remove the casing 15 and a new valve can be inserted and the valve seat be cleaned or refaced if desired.

From the foregoing description, it can be seen that an improved pressure valve and filler plug has been provided for tanks of gravity feed fuel systems which will permit the introducing of pressure into automobile fuel tanks in a convenient and expeditious manner.

Changes in details may be made without departing from the spirit or scope of the invention; but,

We claim:

1. A device for converting a gravity fuel system into a pressure system comprising in combination, a plug for the supply tank provided with a chamber open at the outside of the tank and having a port communicating with the interior thereof, a gasket in said chamber surrounding said port, a casing provided with a valve seat at its interior and a port, said casing extending into said chamber of said plug, detachably connected thereto and engaging said gasket to prevent passage of air under normal conditions to and from the tank except through both of said ports and chamber, and a valve in said chamber adapted to engage the valve seat and close the port of said casing upon pressure in the tank above atmospheric pressure, said casing being capable of movement from the gasket to permit escape of air from the tank and the equalization of exterior and interior atmospheric pressure.

2. In a combined filler plug and pressure valve for fuel tanks, a plug body having a chamber formed in the upper face thereof and communicating with the lower face thereof, the side wall of said chamber being provided with threads, a conical valve casing provided with a valve seat and a port open to the atmosphere, removably associated with the chamber and having threads for engaging the threads formed on the side wall, and a gravity operated valve disposed in the chamber and arranged to fit upon the seat when pressure acts against the lower surface thereof.

3. In a combined filler plug and valve, for fuel tanks, a plug body having a chamber formed in its upper surface and communicating with the lower surface, an axial sleeve extending into the lower end of the chamber having a valve rest formed on the upper end thereof, a removable valve casing associated with the chamber, a nipple formed on the outer end of the valve casing, an inverted conical valve, a valve seat formed in the casing, the valve being adapted to normally fit upon the seat when pressure acts upon the lower surface thereof, a stem, and a head formed upon the lower end of the stem for fitting upon said rest when the pressure on the opposite faces of the plug is equalized.

4. In a combined filler plug and valve for fuel tanks, a plug body having an inwardly extending axial chamber formed in the upper face thereof and provided with a depressed lower wall, an axially disposed sleeve carried by the lower wall and extending outwardly of the opposite faces of the lower wall, the upper end of the sleeve having a valve seat formed thereon and provided with a by-pass adjacent to its upper end, a conical valve casing including an annular threaded base for engaging in the chamber, a nipple formed on the apex of the casing provided with an axial bore, the inner surface of the casing forming a valve seat, a conical valve, a depending stem formed on the base of the valve, and a head formed on the lower end of the stem for normally resting upon the seat formed upon said sleeve, and a gasket disposed in the chamber fitted about the sleeve and arranged to engage the base portion of the conical valve casing.

HERBERT D. FLEMING.
LEO F. MATTHEWS.
EDGAR C. FLEMING.